UNITED STATES PATENT OFFICE.

FREDERICK C. KEIL, OF SAN FRANCISCO, CALIFORNIA, ASSIGNOR, BY MESNE ASSIGNMENT, TO THE THUNDER POWDER COMPANY, OF SAME PLACE.

EXPLOSIVE COMPOUND.

SPECIFICATION forming part of Letters Patent No. 238,916, dated March 15, 1881.

Application filed April 3, 1880. (No specimens.)

*To all whom it may concern:*

Be it known that I, FREDERICK C. KEIL, of the city and county of San Francisco, State of California, have invented a new Explosive Compound; and I do hereby declare the following to be a full description thereof.

My invention relates to an improved compound to be used as an explosive for blasting and other purposes; and it consists in a mixture of nitro-glucose, as an explosive, with other ingredients, forming a compound having absorbing, explosive, and neutralizing qualities, as hereinafter fully described and set forth.

In employing nitro-glucose as an explosive agent and combining it with the absorbents hereinafter mentioned I have overcome the objections, inconveniences, and dangers of using nitro-glycerine either in its pure state or combined with absorbents, such as generation of noxious fumes after explosion and the freezing of and consequent dangers of handling all compounds containing nitro-glycerine which have been exposed to a temperature of below 44° Fahrenheit.

I intend to establish three (3) grades, to be designated as No. 1, No. 2, and No. 3, and the different proportions of the several ingredients are as follows:

No. 1.

| | |
|---|---|
| Nitro-glucose | 50 parts |
| Nitrate of potash | 10 " |
| Chlorate of potash | 10 " |
| Prepared vegetable fiber | 30 " |
| Total | 100 " |

No. 2.

| | |
|---|---|
| Nitro-glucose | 40 parts |
| Nitrate of potash | 20 " |
| Chlorate of potash | 10 " |
| Prepared vegetable fiber | 30 " |
| Total | 100 " |

No. 3.

| | |
|---|---|
| Nitro-glucose | 30 parts |
| Nitrate of potash | 20 " |
| Chlorate of potash | 10 " |
| Prepared vegetable fiber | 40 " |
| Total | 100 " |

I make nitro-glucose as follows: I take of glucose, (dextro-glucose made from starch,) perfectly dry and finely powdered, one part. I then take of nitric acid (specific gravity, 1.50) three parts, and of sulphuric acid (specific gravity, 1.84) six parts. Mix them and let the mixture stand until it has cooled down to $62\frac{1}{2}°$ Fahrenheit. Into this acid mixture I carefully and gradually drop the powdered glucose, keeping it stirred continually, and guarding against the mixture rising to too high a temperature. When the glucose has become thoroughly impregnated with the acids I drop the entire mixture into a vessel containing five times its weight of water, continuing the stirring process, when the nitro-glucose will settle to the bottom. I then decant the water, replacing it with a like quantity of fresh water four or five times, and thoroughly knead the nitro-glucose, either with wooden spoons or other suitable apparatus, until all traces of acids have been removed. The now pure nitro-glucose I dissolve in three parts of alcohol, (for which, however, may be substituted methylated alcohol, benzine, or other volatile solvent,) to transform it into a fluid suitable for mixing with the other ingredients. After having thoroughly mixed the nitro-glucose with the other ingredients, the solvent is evaporated by exposing the compound to a current of air generated by an ordinary blower.

Prepared vegetable fiber consists in sawdust, spent tan, cotton-waste, or other vegetable fiber, which has been most carefully deprived of all tannin, resinous, fatty, or coloring matter, or other soluble impurities, by repeated boiling with alkaline solutions and subsequent washing in pure water, being afterward thoroughly dried.

All the ingredients must be uniformly powdered and carefully mixed before they are mixed with the nitro-glucose.

I am aware that an article called "nitro-glucose," and that nitrate and chlorate of potash and vegetable fiber, have heretofore been claimed as ingredients in an explosive compound, and hence do not claim them, broadly; but What I do claim as new and useful, and desire to secure by Letters Patent, is—

An explosive compound composed of nitro-glucose, (dextro-glucose made from starch,) treated substantially as herein described, nitrate of potash, chlorate of potash, and prepared vegetable fiber, as set forth.

In testimony that I claim the foregoing I have hereunto set my hand and seal this 20th day of March, 1880.

FREDERICK C. KEIL. [L. S.]

Witnesses:
HOLLAND SMITH,
WILLIAM P. COLEMAN.